United States Patent

[11] 3,525,374

[72] Inventors Clifford E. Fitch
279 Homewood Court, Chicago Heights, Illinois 60411
Clifford E. Fitch, Jr., 38 W. 23rd St., Chicago Heights, Illinois 60411
[21] Appl. No. 704,119
[22] Filed Feb. 8, 1968
[45] Patented Aug. 25, 1970

[54] PIZZA MEAT DISPENSER
20 Claims, 16 Drawing Figs.

[52] U.S. Cl................................................ 146/62,
146/151, 146/176, 100/260
[51] Int. Cl........................................................A22c 17/00,
B02c 18/36
[50] Field of Search............................................. 146/62,
151, 176; 83/199, 200, 580, 628, 629; 100/289, 260

[56] References Cited
UNITED STATES PATENTS
494,616  4/1893  Zimmer......................... 83/628X
3,057,523  10/1962  Rietz............................. 146/176X FOREIGN PATENTS
252,001  10/1912  Germany.................. 100/289

Primary Examiner— William S. Lawson
Assistant Examiner— Z. R. Bilinsky
Attorney— Wallenstein, Spangenberg, Hattis and Strampel ABSTRACT: A pizza meat dispenser includes a hopper or the like for containing pizza meat, a dispensing means associated with the hopper for extruding pizza meat from the hopper and severing the extruded pizza meat, and means such as a plunger in the hopper for forcing pizza meat from the hopper through the dispensing means. The pizza meat dispenser may be readily disassembled for cleaning and sanitation purposes. The dispensing means includes a mold plate, a shear plate and a knife plate therebetween, all having holes in alignment when the knife plate is in one position. The plunger is moved by a lead screw and nut means driven by a first motor. A second motor reciprocates the knife plate. The first and second motors are driven in timed relation to provide the aforementioned extrusion and severing of the pizza meat. The dispensing means is heated to prevent the lard and tallow of the pizza meat from sticking thereto.

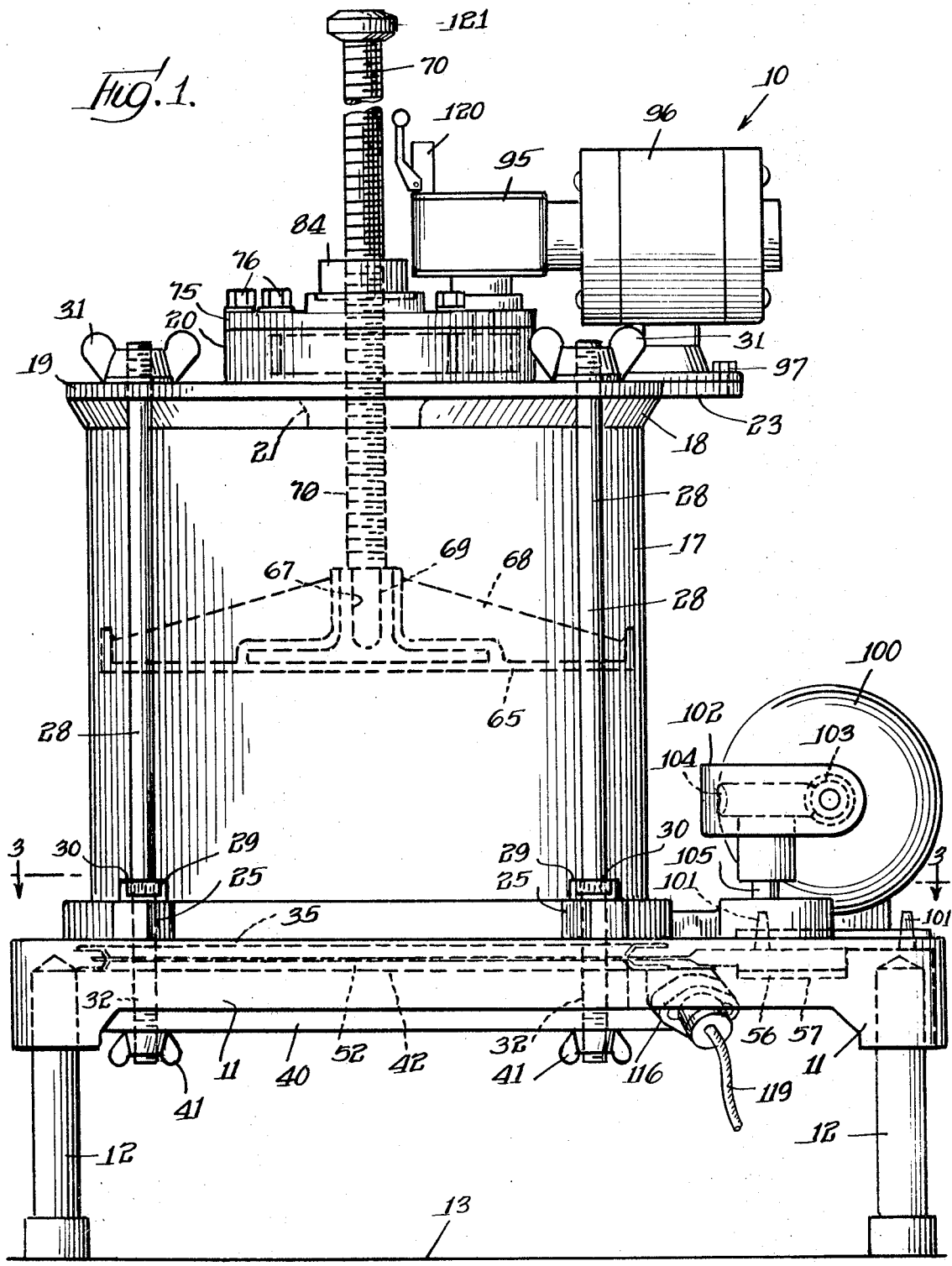

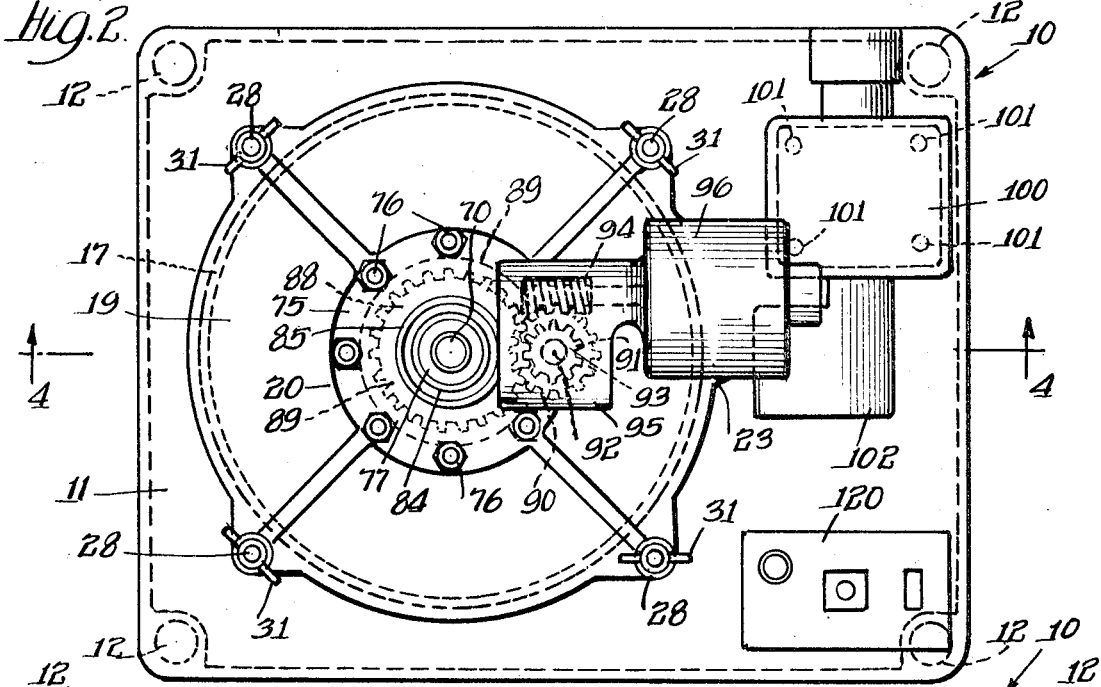
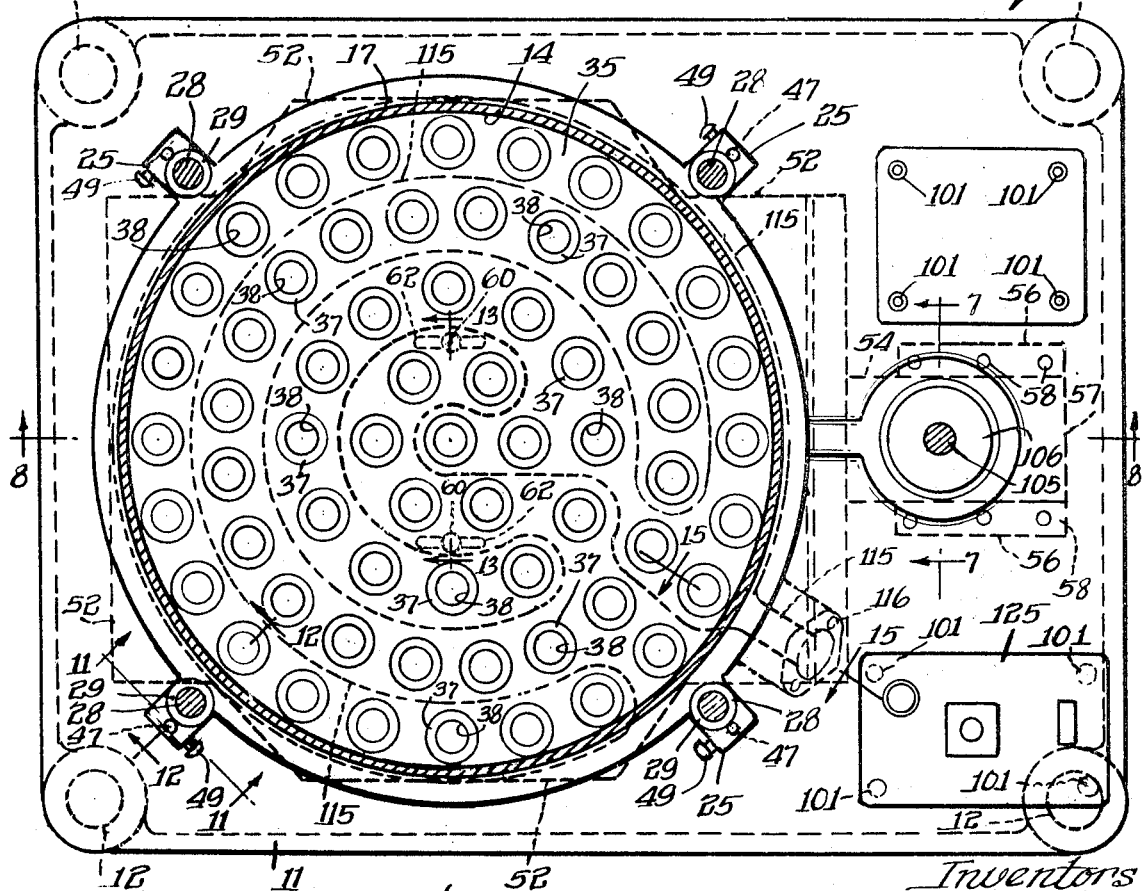

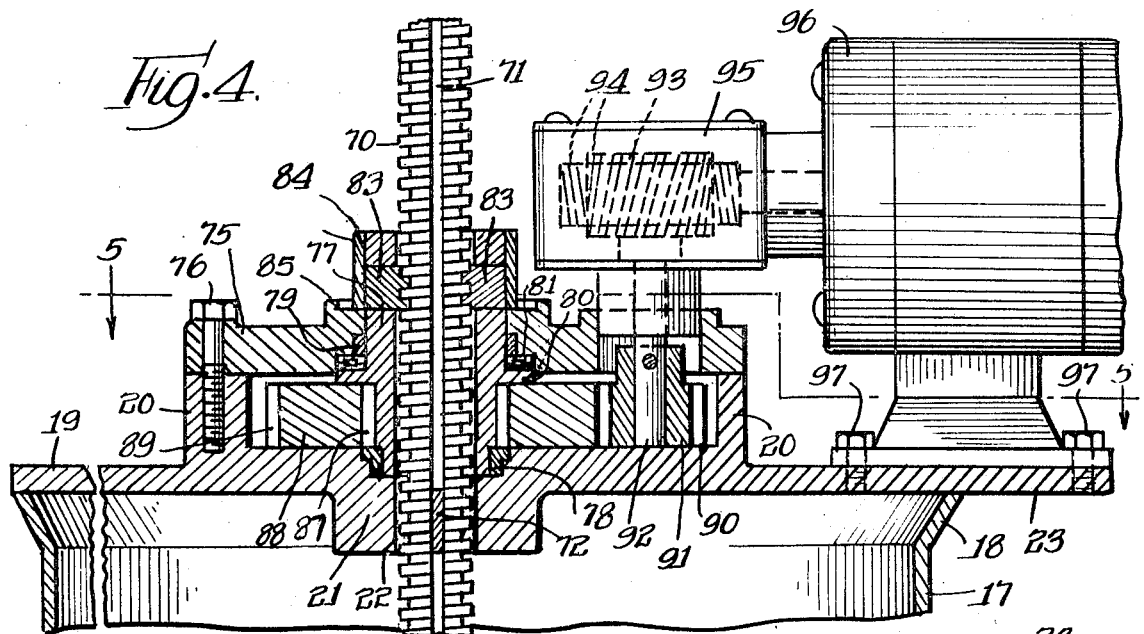
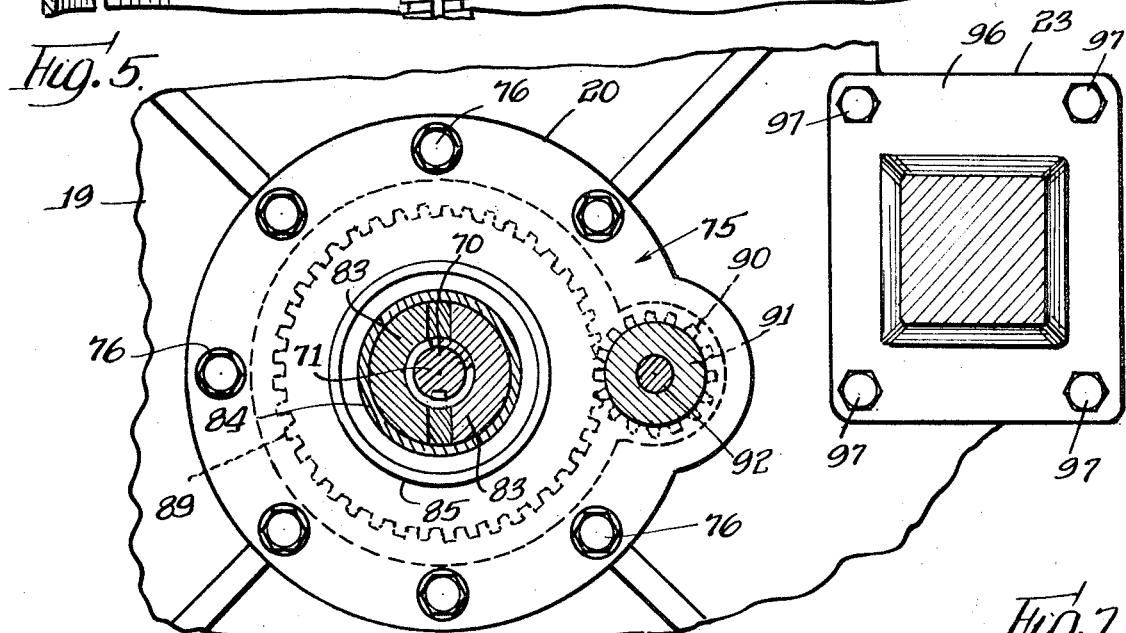
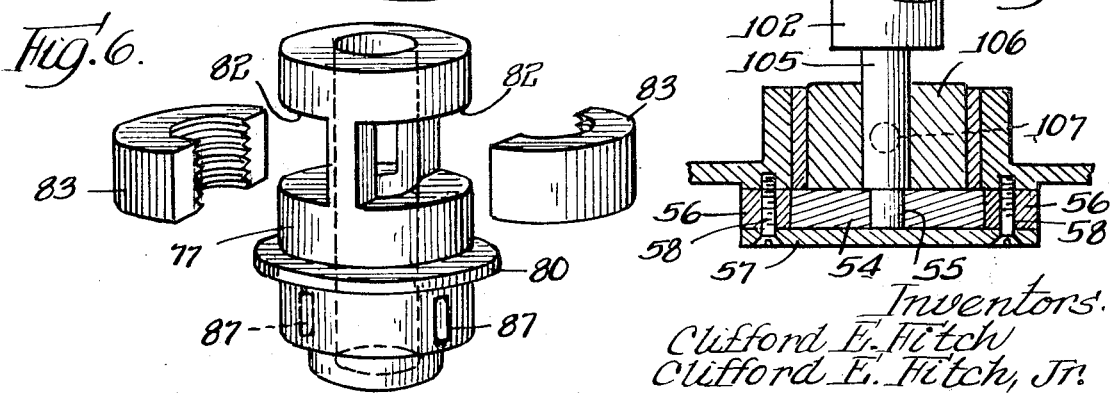
Inventors:
Clifford E. Fitch
Clifford E. Fitch, Jr.
By: Wallenstein, Spangenberg, Hattis & Strampel attys.

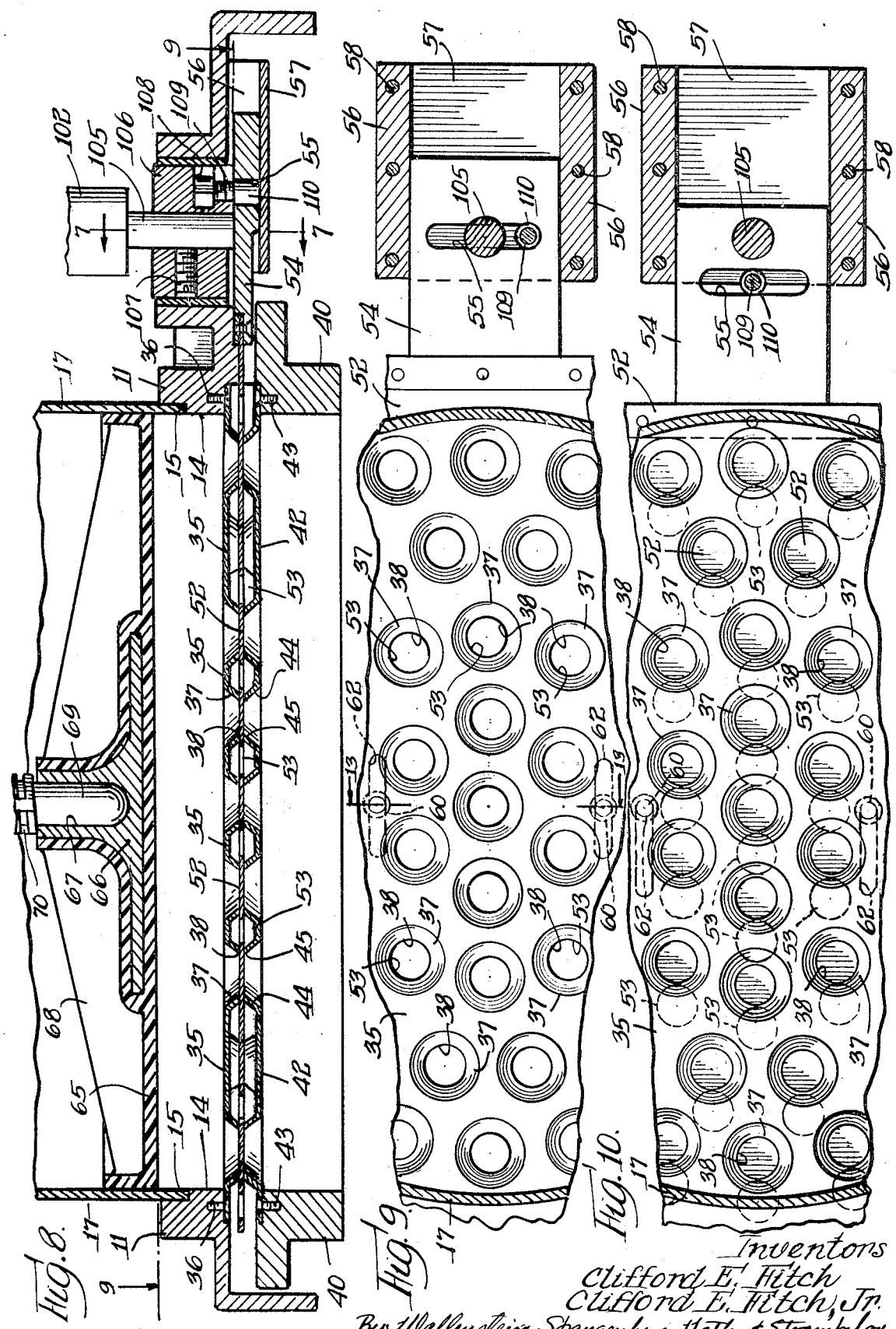

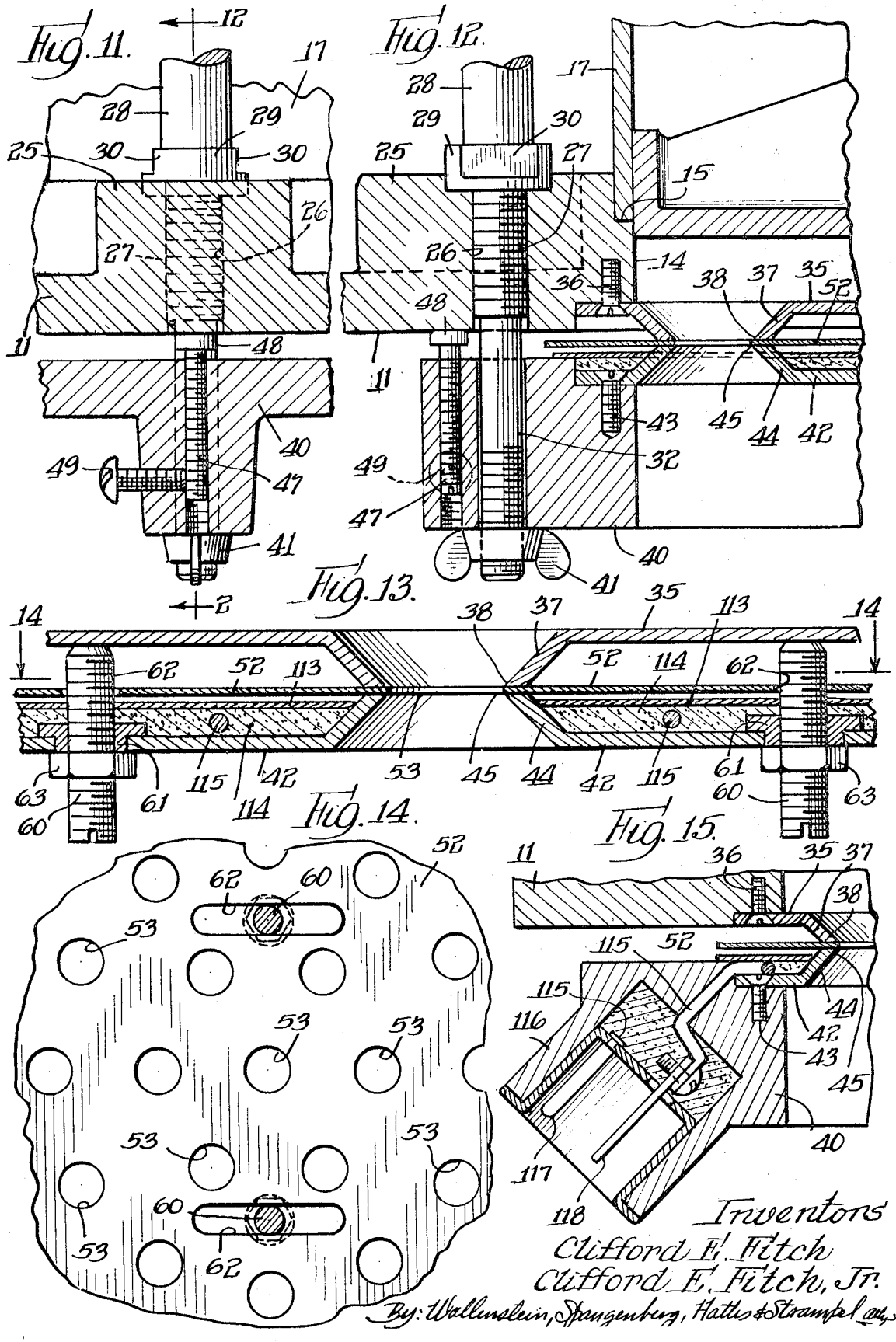

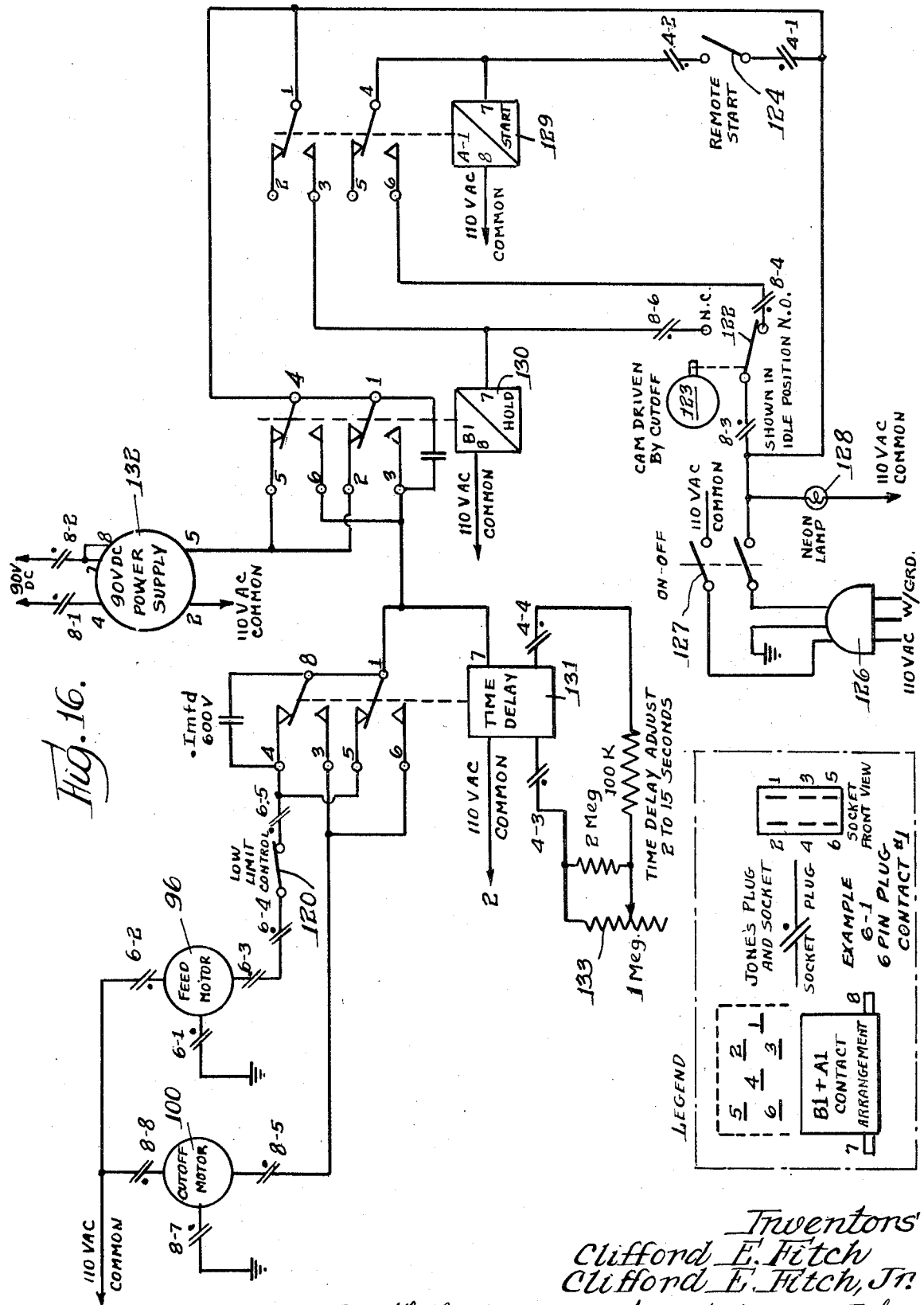

PIZZA MEAT DISPENSER

The principal object of this invention is to provide an improved pizza meat dispenser which is a decided improvement over prior art structures such as disclosed in Donald F. Rietz U.S. Pat. No. 3,057,523.

Briefly, the pizza meat dispenser may include a horizontal supporting base having a central opening therethrough, and an open ended hopper removably carried by the supporting base with one open end thereof over said central opening for supplying pizza meat thereto. A mold plate is carried by the supporting base in the central opening and it has spaced apart holes therethrough. A support ring is removably carried by the supporting base below the central opening and it, in turn, carries a shear plate having spaced apart holes therethrough in vertical alignment with the spaced apart holes in the mold plate. A knife plate is horizontally reciprocatably carried between the mold plate and the shear plate and it has spaced apart holes therethrough which are in register with the spaced apart holes in the mold plate and shear plate when the knife plate is reciprocated to one position and which are out of register therewith when reciprocated to at least another position.

A vertically movable plunger may be arranged in the hopper for extruding pizza meat in the hopper through the spaced apart openings in the mold plate, knife plate and shear plate when these spaced apart openings are in register. A cover is removably carried by the other or upper open end of the hopper and a vertical lead screw extends through the cover and engages the plunger for vertically moving the same in the hopper.

Means including a first motor such as an electric motor carried by the cover and a rotatable nut engaging the lead screw and rotated by the first electric motor vertically move the plunger. The rotatable nut preferably includes a hub rotated by the first motor and a pair of half-nuts rotated by the hub, the half-nuts being separable from the lead screw to allow for withdrawal of the lead screw. The knife plate is provided with an extension having a transverse slot, and means including a rotatable eccentric engageable in the slot and a second motor such as an electric motor removably carried by the supporting base operates to positively reciprocate the knife plate between said one and other positions for severing the pizza meat extruded through the spaced apart holes by the plunger.

The foregoing construction of the pizza meat dispenser of this invention provides for a ready and substantially complete disassembly of the pizza meat dispenser so that the parts thereof may be readily cleaned for sanitation purposes.

The pizza meat dispenser of this invention also includes control means for the first and second motors for normally deenergizing the first and second motors with the knife plate positioned in said one position, for first energizing the first motor through a cycle for extruding the pizza meat through the registered holes in said mold plate, knife plate and shear plate, and for then energizing the second motor through a cycle for reciprocating the knife plate between said one and other positions for severing the pizza meat extruded through the registered holes. Accurate control of the dispensing of the pizza meat is therefore provided.

Also, the mold plate, shear plate and knife plate are made from relatively thin sheet metal. The mold plate and shear plate are formed with spaced apart frusto-conical projections extending toward the knife plate, and the spaced apart holes through the mold plate and shear plate are in the small diameter ends of the frusto-conical projections. The small ends of the frusto-conical projections around the holes are ground flat to cooperate with the holes through the knife plate in severing the extruded pizza meat as the knife plate is reciprocated from its said one position. The frusto-conical projections with their flat ground holes provide improved and efficient severing or cutting edges in conjunction with the knife plate over that obtained by the flat mold and shear plates. The frusto-conical projections also add strength to the thin mold plate and shear plate for resisting the forces produced by the plunger. These thin mold and shear plates may also be inexpensively, accurately and readily made by conventional punch and die and grinding equipment as distinguished from drill press equipment as would be required with thick plates. Adjusting means are also provided for adjusting the spacing between the shear plate and mold plate, and central supporting means between the shear plate and the mold plate are further provided. This construction provides for a long lasting and efficient mechanism for severing or slicing the extruded pizza meat.

A heating coil is preferably carried by the shear plate and it is arranged between the frusto-conical projections thereof for heating the shear plate for preventing the lard and tallow of the pizza meat from sticking thereto.

Further objects of this invention reside in the details of construction of the pizza meat dispenser and in the cooperative relationships between the component parts thereof.

Other objects and advantages of this invention will become apparent to those skilled in the art upon reference to the accompanying specification, claims and drawings in which:

FIG. 1 is a side elevation view of the pizza meat dispenser of this invention;

FIG. 2 is a top plan view of the pizza meat dispenser;

FIG. 3 is an enlarged horizontal sectional view through the pizza meat dispenser taken substantially along the line 3—3 of FIG. 1 with the electric motor for reciprocating the knife plate removed;

FIG. 4 is a vertical sectional view through the upper part of the pizza meat dispenser and taken substantially along the line 4—4 of FIG. 2;

FIG. 5 is a horizontal sectional view taken substantially along the line 5—5 of FIG. 4;

FIG. 6 is an exploded perspective view of the hub and half-nut illustrated in FIGS. 4 and 5;

FIG. 7 is a vertical sectional view through the eccentric drive for the knife plate and taken substantially along the lines 7—7 of FIGS. 3 and 8;

FIG. 8 is an enlarged sectional view taken substantially along the line 8—8 of FIG. 3 and showing the knife plate in a retracted position;

FIG. 9 is a partial sectional view taken substantially along the line 9—9 of FIG. 8 and showing the knife plate in its normal mid position;

FIG. 10 is a view similar to FIG. 9 but showing the knife plate in an advanced position;

FIG. 11 is a vertical sectional view taken substantially along the line 11—11 of FIG. 3;

FIG. 12 is a vertical sectional view taken substantially along the lines 12—12 of FIGS. 3 and 11;

FIG. 13 is a vertical sectional view taken substantially along the lines 13—13 of FIGS. 3 and 9;

FIG. 14 is a horizontal sectional view taken substantially along the line 14—14 of FIG. 13;

FIG. 15 is a vertical sectional view taken substantially along the line 15—15 of FIG. 3 ; and FIG. 16 is a wiring diagram of the electrical control means for the first and second electric motors which drive the plunger and the knife plate, respectively.

Referring first to FIGS. 1 to 3, the pizza meat dispenser of this invention is generally designated at 10 and it includes a horizontal supporting base 11 which is held above a horizontal surface 13 by means of legs 12. The supporting base 11 has a central opening 14 therethrough as shown more clearly in FIG. 8, this central opening 14 having an internal annular recess 15 for removably receiving the lower open end of a vertically arranged cylindrical hopper 17. The upper end of the hopper 17 is flared outwardly as indicated at 18 and removably carries a cover 19. The cover 19 has a substantially annular upstanding boss 20 and a downwardly extending boss 21 provided with a central hole 22. The cover 19 is also provided with an extension 23 for supporting a motor such as an electric motor 96.

The upper annular portion of the supporting base 11 is provided with outwardly extending ears 25 having tapped holes 26 extending therethrough as shown more clearly in FIGS. 11 and 12. Screw threaded portions 27 of vertically extending rods 28 are threaded into the tapped holes 26 and are drawn up tight against shoulders 29 on the rods 28, the shoulders 29 having flats 30 to assist in the screwing of the rods 28 into the tapped holes in the supporting base 11. The upper ends of the rods 28, which are so held in the supporting base 11, extend through holes in the cover 19 and are threaded and provided with wing nuts 31 for removably securing the cover 19 onto the upper end of the hopper 17 and for removably securing the lower end of the hopper 17 in the supporting base 11. Thus, by removing the wing nuts 31 the cover 19 and the hopper 17 may be readily removed for cleaning and sanitation purposes. The lower ends of the rods 28 are also provided with reduced threaded portions 32 which are adapted to receive wing nuts 41.

As shown more clearly in FIGS. 8 and 12, a circular mold plate 35 is secured to the bottom side of the supporting base 11 by a plurality of circumferentially arranged screws 36, the mold plate 35 being arranged in the central opening 14 in the supporting base 11. The mold plate 35 is made of relatively thin sheet metal and is provided with a plurality of downwardly extending frusto-conical projections 37 defining holes 38 therein. The bottoms of the projections are ground so as to provide sharp severing or cutting edges at the holes 38. The frusto-conical projections 37 and holes 38 may be inexpensively, accurately and readily made by conventional punch and die and grinding equipment. Furthermore, these frusto-conical projections 37 add strength to the relatively thin mold plate 35 so as to minimize flexing thereof resulting from pressure applied thereto.

A support ring 40 is carried by the screw threaded extensions 32 of the rods 28 and is held in place thereon by the wing nuts 41 screwed on to the threaded extensions 32. The support ring 40 has a shear plate 42 secured thereto by a plurality of circumferentially arranged screws 43. This shear plate 42 is also made from relatively thin sheet metal and corresponds in all respects to the mold plate 35. In this connection, the shear plate 42 has upwardly extending conical projections 44 terminating in holes 45, the projections and holes 45 being in vertical alignment with the projections 37 and holes 38 in the mold plate 35.

The shear plate 42 carried by the support ring 40 is held in spaced apart relation from the mold plate 35 by means of adjusting screws 47 in the support ring 40 having heads 48 engaging the underside of the supporting base 11 as shown more clearly in FIGS. 11 and 12. The adjusting screws 47 are manipulated to properly position the support ring 40 and, hence, the shear plate 42 with respect to the mold plate 35 and when the shear plate 42 is so properly positioned, set screws 49 are drawn tight against the adjusting screws 47 to maintain the proper position of the shear plate 42.

Interposed between the mold plate 35 and the shear plate 42 is a knife plate 52 having a plurality of holes 53 therein, the holes 53 being in alignment with or in register with the holes 38 and 45 of the mold plate 35 and shear plate 42 when the knife plate 52 is in a mid position as shown in FIGS. 3 and 9. The knife plate 52 is reciprocatingly supported between the mold plate 35 and shear plate 42 and is provided with an extension 54 having a transverse slot 55. The extension 54 is guided for reciprocation between a pair of guide members 56 extending downwardly from the bottom of the supporting base 11, the extension 54 being held in place between the guides 56 by a plate 57 suitably secured to the undersides of the guides 56 by screws 58. When the extension 54 is in mid position, the holes 53 in the knife plate are in register with the holes 38 and 45 in the mold plate 35 and the shear plate 42 as illustrated in FIG. 9. When the extension 54 is retracted from the mid position, the holes 53 are out of register with the holes 38 and 45 as illustrated in FIG. 8, and, likewise, when the extension 54 is advanced, the holes 53 in the knife plate 52 are out of register with the holes 38 and 45 as shown in FIG. 10. The normal position of the knife plate 52 is the mid position illustrated in FIG. 9.

In addition to controlling the spacing between the shear plate 42 and the mold plate 35 at its periphery as described above in connection with FIGS. 11 and 12 the spacing between the centers of the shear plate 42 and the mold plate 35 is also properly maintained by the adjusting screws 60 illustrated in FIGS. 13 and 14. Here, the adjusting screws 60 are adjustably carried by nuts 61 in the shear plate 42 and are locked in proper adjusted position by lock nuts 63. The adjusting screws 60 extend through slots 62 in the reciprocatable knife plate 52 and bear against the underside of the mold plate 35. Thus, the spacing between the shear plate 42 and the mold plate 35 is accurately maintained at the centers of those plates as well as at the peripheries thereof. The spacing between the shear plate 42 and the mold plate 35 is such as to bring the ground edges of the frusto-conical projections 44 and 37 substantially against the knife plate 52 and yet allow the knife plate 52 to be readily reciprocated without binding.

As shown more clearly in FIGS. 1 and 8, a plunger 65 is vertically arranged within the hopper 17. The plunger 65 is provided with a central hub and radially arranged reinforcing ribs 68. The plunger may be made in one piece from metal or it may be made of plastic having a central metal reinforcing portion 66 as illustrated in FIG. 8. In any event, the plunger is provided with a central socket 67 for receiving the lower end 69 of a lead screw 70. The lead screw 70 extends upwardly through the hole 22 in the boss 21 of the cover 19 as shown more clearly in FIGS. 1 and 4. The lead screw 70 may be provided with a longitudinally extending slot 71 for receiving a key 72 carried by the boss 21 of the cover 19 to prevent rotation of the lead screw 70 with respect to the cover 19.

Referring more particularly to FIG. 4, a closure member 75 for enclosing the space within the substantially annular boss 20 is held in place by a plurality of screws 76. The closure member 75 has a central opening for receiving a hub 77. The lower end of the hub 77 is journaled for rotation in the cover 19 by a bearing 78 and the intermediate portion of the hub 77 is journaled for rotation in the closure member 75 by a bearing 79. The hub 77 is also provided with an annular flange 80 and a thrust bearing 81 is arranged between this flange 80 and the closure member 75. The hub 77 is provided with a pair of lateral recesses 82 for receiving half-nuts 83, the half-nuts 83 being held in engagement with the lead screw 70 by a sleeve 84 slidably mounted on the hub 77. When the sleeve 84 is raised, the half-nuts 83 may be moved outwardly to free them from the lead screw 70 so that the lead screw may be manually moved vertically with respect to the cover 19. The closure member 75 is also provided with an annular flange 85 to limit the outward movement of the half-nuts 83 so that they may not fall away and be lost. When, however, the half-nuts 83 are brought into engagement with the lead screw 70 and are held in place by the sleeve 84, longitudinal manual movement of the lead screw 70 is prevented and the lead screw 70 may be lowered only by rotation of the hub 77 and the half-nuts 83 carried thereby.

A gear 88 within the substantially annular flange 20 is keyed by keys 87 to the hub 77. The teeth 89 on the gear 88 mesh with teeth 90 on a pinion 91 pinned to a shaft 92 which is driven through a gear reducer by a first electric motor 96. Here, a worm wheel 93 meshes with a worm gear 94 within a housing 95, the worm gear 94 being driven by the electric motor 96. The electric motor 96 is secured to the extension 23 of the cover 19 by bolts 97. Thus, as the electric motor 96 is energized, the gear 88 is rotated through the gear reducer to rotate the hub 77 and half-nuts 83 to drive the lead screw 70 and, hence, the plunger 65 downwardly in the hopper 17.

Referring now more particularly to FIGS. 1, 2 and 3, a second motor such as an electric motor 100 is removably mounted on the supporting base 11 by tapered pins 101 carried by the supporting base 11. This second electric motor 100 operates through a gear reducer 102 including a worm gear 103 and a worm wheel 104 for rotating a shaft 105. The shaft 105 has an eccentric 106 secured thereto by a set screw 107, as shown more clearly in FIGS. 7 and 8. The eccentric 106 is provided with a slot 108 for receiving the head of a screw 109 which in turn carries a roller 110 which is adapted to be received within the transverse slot 55 of the extension 54 on the knife plate 52. When the second electric motor 100 and the eccentric 106 are positioned on the supporting base 11 with the roller 110 engaging in the slot 55 and the motor is energized, the eccentric 106 is rotated and the roller 110 operating in the slot 55 causes the knife plate 52 to be horizontally reciprocated. In a cycle of operation the knife plate 52 moves from its mid position to one extreme position, to the mid position, to another extreme position and back to the mid position, two severing or slicing operations being accomplished upon rotation of the eccentric 106 through 360°.

As shown more clearly in FIGS. 3, 13 and 14, a heater wire 115 is arranged on the upper side of the shear plate 42 and extends around the frusto-conical projections 44 for the purpose of heating the shear plate 42. The heater 115 may be potted into place by suitable potting material 114 which in turn may be held in place by a suitable plate 113. The heater 115 extends to a socket having prongs 118 for supplying electrical energy and a ground prong 117 arranged within a downwardly and outwardly extending projection 116 on the support ring 40. The socket receives a plug having supply and ground wires 119 for supplying electrical energy to the heater 115. The purpose of heating the shear plate 42 is to prevent the lard and tallow of the pizza meat from sticking to the shear plate 42 as the pizza meat is severed by the knife plate 52.

The cover 19 of the pizza meat dispenser carries a switch 120 which is normally closed but which is opened when a cam 121 on the lead screw 70 operates the switch upon the plunger 65 being driven to the bottom of the hopper 17. This switch 120 is illustrated also in the wiring diagram of FIG. 16. The wiring diagram also includes a single pole double throw switch 122 which is operated by a cam 123 driven by the shaft 105 which reciprocates the knife plate 52. The switch 122 is shown in the idle position where the knife plate 52 is in its mid position. When the eccentric 106 is rotated by energization of the second electric motor 100, the switch 122 is moved to the opposite position until the eccentric 106 makes a complete revolution whereupon the switch 122 is returned to its idle position as illustrated. The wiring diagram also contemplates a remote start button or momentary switch 124 for cycling the pizza meat dispenser through a complete cycle of operation. The switches 120, 122 and 124 and the first electric motor 96 and the second electric motor 100 are suitably connected by cables and sockets to a control unit 125 which is also removably mounted by tapered pins 101 on the supporting base 11 as illustrated in FIG. 3. The control unit 125 is supplied with electrical power from a plug 126 through an on-off switch 127 arranged therein. A lamp 128 in the control unit 125 indicates the application of electrical energy thereto. The control unit 125 also includes a start relay 129, a hold relay 130, a time delay relay 131 and a D.C. power supply 132. The time delay relay 131 may have its time delay adjusted by means of a rheostat 133 and associated resistances which are connected through a socket to the time delay relay. The D.C. power supply is connected through a socket and cable to the second electric motor 100.

In operation, the hopper 17 is supplied with pizza meat, the plunger 65 is placed upon the pizza meat, the cover 19 is secured to the hopper 17, the lead screw 70 is inserted through the cover into the socket 67 in the plunger 65, the heater 115 in the shear plate 42 is energized through the socket 116, with all of the electrical connections made the on-off switch 127 is closed, and a pizza pie upon which pizza meat is to be dispensed is placed on the surface 13 below the pizza meat dispenser 10. At this time both the first and second electric motors 96 and 100 are deenergized and the knife plate 52 is in its mid position with its holes 53 in register with the holes 38 and 45 in the mold plate 35 and shear plate 42.

When the start button or switch 124 is closed, a starting circuit is completed through the start relay 129 to energize the same which closes contacts 4, 6 and 1, 3 thereof. The start relay 124 is maintained energized through switch 122 and contacts 4, 6 even though the start button or switch 124 is subsequently opened. Closing of contacts 1, 3 of start relay 129, causes hold relay 130 to be energized therethrough. Energization of hold relay 130 causes power to be supplied through parallel contacts 1, 3 and 4, 6 thereof to the time delay relay 131 to start the preset time delay sequence thereof which may be adjusted by the rheostat 133. At the same time, power is supplied through parallel contacts 1, 5 and 4, 8 of the time delay relay 131 and the limit switch 120 to the first electric motor 96 to energize the same. The first electric motor 96 thereupon drives the plunger 65 downwardly through the lead screw 70 to extrude pizza meat through the registered holes 38, 53 and 45 in the mold plate 35, knife plate 52 and shear plate 42.

When the time delay relay 131 "times out", the desired selected amount of pizza meat is extruded through the registered holes and the parallel contacts 1, 5 and 4, 8 thereof are opened and the parallel contacts 1, 6 and 3, 8 thereof are closed. Opening of the parallel contacts 1, 5 and 4, 8 de-energizes the first electric motor 96 to stop further extrusion of the pizza meat through the registered holes 38, 53 and 45. Closing of the parallel contacts 1, 6 and 3, 8 supplies power to the second electric motor 100 for energizing the same. The second electric motor 100 causes the knife plate 52 to start its movement in one direction from its mid position.

When the second electric motor 100 starts to operate, the cam 123 moves the switch 122 to its opposite position. This causes start relay 129 to become de-energized to open contacts 1, 3 and 4, 6 thereof. However, the hold relay 130 will remain energized through the switch 122 to continue the operation of the second electric motor 100. In its operation, the second electric motor 100 causes the knife plate 52 to reciprocate from its mid position, to one extreme position, to the mid position, to the other extreme position and back to the mid position as the eccentric 106 and the cam 123 are rotated through 360°. Thus, two severing and slicing operations are performed on the pizza meat which had previously been extruded through the registered holes in the mold plate, knife plate and shear plate.

When the eccentric 106 and the cam 123 have completed the 360° rotation, the cam 123 returns the switch 122 to its initial position, as illustrated, which opens the holding circuit to the holding relay 130 to de-energize the same. When the holding relay 130 is so de-energized, the parallel contacts 1, 3 and 4, 6 thereof open and the parallel contacts 1, 2 and 4, 5 thereof close. Opening of the contacts 1, 3 and 4, 6 interrupts the current to the second electric motor 100 and to the time delay relay 131. Closing of the contacts 1, 2 and 4, 5 activates the D.C. power supply 132 for applying D.C. current to the second electric motor 100 to brake the same promptly to a halt with the switch 122 still in the illustrated position and with the knife plate 52 still in its mid position with the holes thereof in register with the holes in the mold plate and the shear plate. When the current to the time delay relay 131 is so interrupted, the time delay relay 131 de-energizes and resets itself ready for the next cycle of operation.

The aforementioned extrusion and severing cycle can be readily disassembled so that it may be cleaned and kept in good sanitary condition. To disassemble the machine, the first operation is to lift the sleeve 84 and move the two half-nuts 83 back away from engagement with the lead screw 70. The lead screw 70 is then removed upwardly through the cover 19. By removing the four wing nuts 31 the cover 19 is removed and placed aside. The plunger 65 is then removed and the hopper 17 as well. The second electric motor 100 and the eccentric 106 driven thereby and, also the control unit 125 are readily removed from the supporting base 11 since they are only retained in place by the tapered pins and can be readily lifted up and removed. By removing the four wing nuts 41 on the underside, the support ring 40 and the shear plate 42 carried thereby drop off and also the knife plate 52 may be readily removed. All of these parts which are so removed and which are in contact with the pizza meat can be put in a tub and washed and kept in a good sanitary condition. When these various parts are removed, the mold plate 35 is exposed on each side and may be readily washed and kept in a good sanitary condition.

The spacings of the holes in the mold plate 35 and shear plate 42 are such as to provide an even distribution of pizza meat on the pizza pie.

While for purposes of illustration, one form of this invention has been disclosed, other forms thereof may become apparent to those skilled in the art upon reference to this disclosure and, therefore, this invention is to be limited only by the scope of the appended claims.

We claim:

1. A pizza meat dispenser comprising a horizontal supporting base having a central opening therethrough, an open ended hopper removably carried by said supporting base with one open end thereof over said central opening for supplying pizza meat thereto, a mold plate carried by said supporting base in said central opening and having spaced apart holes therethrough, a support ring removably carried by said supporting base below said central opening, a shear plate carried by said support ring and having spaced apart holes therethrough in vertical alignment with the spaced apart holes through said mold plate, a knife plate horizontally reciprocatably carried between said mold plate and shear plate and having spaced apart holes therethrough which are in register with the spaced apart holes in said mold plate and shear plate when the knife plate is reciprocated to one position and which are out of register therewith when reciprocated to at least another position, a vertically movable plunger in said hopper for extruding pizza meat in said hopper through said spaced apart openings in said mold plate, knife plate and shear plate when said spaced apart openings are in register, a cover removably carried by the other open end of said hopper, a vertical lead screw extending through the cover and engaging the plunger for vertically moving the same in the hopper, means including a detachable rotatable nut engaging the lead screw and a first motor for rotating the nut carried by the cover for vertically moving the plunger, an extension having a transverse slot carried by the knife plate, and means including a rotatable eccentric engageable in said slot and a second motor for rotating the eccentric removably carried by the supporting base for positively reciprocating said knife plate between said one and other positions for severing the pizza meat extruded through said spaced apart holes, said lead screw being removable from said cover, said cover and said means including said detachable rotatable nut and said first motor carried by said cover being removable from said hopper, said hopper being removable from said supporting base, said plunger being removable from said hopper, said means including said rotatable eccentric and said second motor being removable from said supporting base, said support ring and said shear plate carried by said support ring being removable from said supporting base, and said knife plate being removable when said support ring and said shear plate are removed, whereby said disassembled parts may be readily cleaned for sanitation purposes.

2. A pizza meat dispenser as defined in claim 1 including control means for said first and second motors for normally de-energizing said first and second motors with said knife plate positioned in said one position, for first energizing said first motor through a cycle for extruding the pizza meat through the registered holes in said mold plate, knife plate and shear plate, and for then energizing said second motor through a cycle for reciprocating said knife plate between said one and other positions for severing the pizza meat extruded through said registered holes.

3. A pizza meat dispenser as defined in claim 1 wherein said one position of the knife plate is a mid position in the reciprocating stroke thereof and said at least another position of the knife plate are positions in the reciprocating stroke thereof on opposite sides of the mid position.

4. A pizza meat dispenser as defined in claim 3 including control means for said first and second motors for normally de-energizing said first and second motors with said knife plate positioned in said one position, for first energizing said first motor through a cycle for extruding the pizza meat through the registered holes in said mold plate, knife plate and shear plate, and for then energizing said second motor through a cycle for reciprocating said knife plate between said one and other positions for severing the pizza meat extruded through said registered holes.

5. A pizza meat dispenser as defined in claim 1 wherein said mold plate, shear plate and knife plate are formed from relatively thin sheet metal, said mold plate and shear plate are formed with spaced apart frusto-conical projections extending toward said knife plate, said spaced apart holes through said mold plate and shear plate are in the small diameter ends of said frusto-conical projections, and the small ends of said frusto-conical projections around said holes are ground flat to cooperate with the holes through the knife plate in severing the extruded pizza meat as the knife plate is reciprocated from said one position.

6. A pizza meat dispenser as defined in claim 5 including means for adjusting the spacing between the shear plate and the mold plate.

7. A pizza meat dispenser as defined in claim 1 including a heating coil for said shear plate for heating the same.

8. A pizza meat dispenser as defined in claim 1 wherein said rotatable nut includes a driving hub rotatably mounted in said cover and rotated by said first motor, a pair of half-nuts laterally movably carried by said driving hub for rotation therewith, and a longitudinally movable sleeve about said driving hub and said half-nuts for holding said half-nuts in engagement with said lead screw when in one position for longitudinally moving said lead screw as said driving hub is rotated and for freeing said half-nuts when in another position to allow said half-nuts to laterally move and disengage said lead screw for permitting free longitudinal movement of said lead screw.

9. A pizza meat dispenser as defined in claim 8 including an annular shoulder on said cover to prevent complete lateral movement of said half-nuts from said driving hub.

10. In a pizza meat dispenser including a mold plate having spaced apart holes therethrough associated with the hopper, a shear plate adjacent the mold plate and having spaced apart holes therethrough in alignment with the spaced apart holes in the mold plate, a knife plate reciprocatably mounted between said mold plate and shear plate and having spaced apart holes therethrough which are in register with the spaced apart aligned holes in said mold plate and shear plate when the knife plate is reciprocated to one position and which are out of register therewith when reciprocated to at least another position, and means for extruding pizza meat in through said spaced apart openings in said mold plate, knife plate and shear plate when said spaced apart openings are in register, the improvement wherein, said mold plate, shear plate and knife plate are formed from relatively thin sheet metal, said mold plate and shear plate are formed with spaced apart frusto-conical projections extending toward said knife plate, said spaced apart holes through said mold plate and shear plate are in the small diameter ends of said frusto-conical projections, and the small ends of said frusto-conical projections around said holes are ground flat to cooperate with the holes through the knife plate in severing the extruded pizza meat as the knife plate is reciprocated from said one position.

11. In a pizza meat dispenser as defined in claim 10, the further improvement comprising means for adjusting the spacing between the shear plate and the mold plate.

12. In a pizza meat dispenser as defined in claim 10, the further improvement comprising adjusting screws adjacent the perimeter of the shear plate for adjusting the spacing between the shear plate and the mold plate adjacent the peripheries thereof.

13. In a pizza meat dispenser as defined in claim 10, the further improvement comprising adjusting screws carried by the shear plate adjacent the center thereof and engaging the mold plate for adjusting the spacing between the shear plate and the mold plate adjacent the centers thereof, and slots in the knife plate for accommodating said adjusting screws.

14. In a pizza meat dispenser as defined in claim 12, the further improvement comprising adjusting screws carried by the shear plate adjacent the center thereof and engaging the mold plate for adjusting the spacing between the shear plate and the mold plate adjacent the centers thereof, and slots in the knife plate for accommodating said adjusting screws.

15. In a pizza meat dispenser as defined in claim 10, the further improvement comprising a heating coil carried by said shear plate and arranged between the frusto-conical projections thereof for heating said shear plate.

16. In a pizza meat dispenser as defined in claim 10, the further improvement wherein said one position of the knife plate is a mid position in the reciprocating stroke thereof and said at least another position of the knife plate are positions in the reciprocating stroke thereof on opposite sides of the mid position.

17. In a pizza meat dispenser as defined in claim 10, the further improvement comprising means including a first motor for operating said extruding means, means including a second motor for reciprocating said knife plate, and control means for said first and second motors for normally de-energizing said first and second motors with said knife plate positioned in said one position, for first energizing said first motor through a cycle for extruding the pizza meat through the registered holes in said mold plate, knife plate and shear plate, and for then energizing said second motor through a cycle for reciprocating said knife plate between said one and other positions for severing the pizza meat extruded through said registered holes.

18. In a pizza meat dispenser as defined in claim 16, the further improvement comprising means including a first motor for operating said extruding means, means including a second motor for reciprocating said knife plate, and control means for said first and second motors for normally de-energizing said first and second motors with said knife plate positioned in said one position, for first energizing said first motor through a cycle for extruding the pizza meat through the registered holes in said mold plate, knife plate and shear plate, and for then energizing said second motor through a cycle for reciprocating said knife plate between said one and other positions for severing the pizza meat extruded through said registered holes.

19. In a pizza meat dispenser including a hopper for containing pizza meat, dispensing means associated with said hopper for extruding pizza meat from said hopper and severing said extruded pizza meat, and a plunger in said hopper for forcing pizza meat from said hopper through said dispensing means, the improvement comprising, a cover removably carried by said hopper, a lead screw extending through said cover and engaging said plunger for moving the same in said hopper, a driving hub rotatably mounted in said cover about said lead screw, means including a motor for rotating said driving hub, a pair of half-nuts laterally movably carried by said driving hub for rotation therewith, and a longitudinally movable sleeve about said driving hub and said half-nuts for holding said half-nuts in engagement with said lead screw when in one position for longitudinally moving said lead screw as said driving hub is rotated and for freeing said half-nuts when in another position to allow said half-nuts to laterally move and disengage said lead screw for permitting free longitudinal movement of said lead screw.

20. In a pizza meat dispenser as defined in claim 19, the further improvement comprising an annular shoulder on said cover to prevent complete lateral movement of said half-nuts from said driving hub.